United States Patent
Frans et al.

(10) Patent No.: US 10,452,601 B2
(45) Date of Patent: *Oct. 22, 2019

(54) INTERFACE WITH VARIABLE DATA RATE

(71) Applicant: Rambus Inc., Sunnyvale, CA (US)

(72) Inventors: Yohan U. Frans, Sunnyvale, CA (US);
Hae-Chang Lee, Los Altos, CA (US);
Brian S. Leibowitz, San Francisco, CA
(US); Simon Li, Cupertino, CA (US);
Nhat M. Nguyen, San Jose, CA (US)

(73) Assignee: RAMBUS INC., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/947,701

(22) Filed: Apr. 6, 2018

(65) Prior Publication Data
US 2018/0329859 A1   Nov. 15, 2018

Related U.S. Application Data

(63) Continuation of application No. 15/393,234, filed on Dec. 28, 2016, now Pat. No. 9,940,299, which is a
(Continued)

(51) Int. Cl.
*G06F 13/42* (2006.01)
*H04L 1/00* (2006.01)
(Continued)

(52) U.S. Cl.
CPC ........ *G06F 13/4286* (2013.01); *G06F 13/385*
(2013.01); *G06F 13/4068* (2013.01);
(Continued)

(58) Field of Classification Search
CPC ................. H04L 25/0292; H04L 25/0272
(Continued)

(56) References Cited

U.S. PATENT DOCUMENTS 4,679,191 A * 7/1987 Nelson .................. H04L 5/24
370/355
5,684,429 A 11/1997 Sanwo et al.
(Continued)

FOREIGN PATENT DOCUMENTS

WO  WO-1999-020016    4/1999
WO  WO-2001-037506    5/2001
WO  WO-2004-105334 A3  12/2004

OTHER PUBLICATIONS

Chen et al., "A 1.25Gb/s, 460mW CMOS Transceiver for Serial Data Communication," ISSCC97, Session 15, Serial Data Communications, Paper FP 15.3, pp. 242-243, 465, Feb. 7, 1997. 3 pages.
(Continued)

*Primary Examiner* — Titus Wong
(74) *Attorney, Agent, or Firm* — Morgan, Lewis & Bockius LLP

(57) ABSTRACT

A device includes a transmitter coupled to a node, where the node is to couple to a wired link. The transmitter has a plurality of modes of operation including a calibration mode in which a range of communication data rates over the wired link is determined in accordance with a voltage margin corresponding to the wired link at a predetermined error rate. The range of communication data rates includes a maximum data rate, which can be a non-integer multiple of an initial data rate.

20 Claims, 12 Drawing Sheets

Related U.S. Application Data continuation of application No. 14/931,652, filed on Nov. 3, 2015, now Pat. No. 9,569,396, which is a continuation of application No. 14/507,743, filed on Oct. 6, 2014, now Pat. No. 9,178,647, which is a continuation of application No. 13/633,076, filed on Oct. 1, 2012, now Pat. No. 8,855,217, which is a continuation of application No. 12/518,781, filed as application No. PCT/US2007/087027 on Dec. 10, 2007, now Pat. No. 8,279,948.

(60) Provisional application No. 60/869,895, filed on Dec. 13, 2006, provisional application No. 60/869,896, filed on Dec. 13, 2006.

(51) Int. Cl.

| | | |
|---|---|---|
| *H04L 1/20* | (2006.01) | |
| *H04L 1/24* | (2006.01) | |
| *H04L 5/14* | (2006.01) | |
| *H04L 25/02* | (2006.01) | |
| *G06F 13/38* | (2006.01) | |
| *G06F 13/40* | (2006.01) | |

(52) U.S. Cl.
CPC .......... *H04L 1/0002* (2013.01); *H04L 1/0015* (2013.01); *H04L 1/203* (2013.01); *H04L 1/205* (2013.01); *H04L 1/243* (2013.01); *H04L 5/1446* (2013.01); *H04L 25/0262* (2013.01); *H04L 25/0292* (2013.01); *Y02D 50/10* (2018.01)

(58) Field of Classification Search
USPC .......................................................... 710/14
See application file for complete search history.

(56) References Cited

U.S. PATENT DOCUMENTS

| | | | |
|---|---|---|---|
| 6,021,158 A * | 2/2000 | Schurr | ................. H04L 1/0003 375/211 |
| 6,075,821 A | 6/2000 | Kao et al. | |
| 6,160,842 A | 12/2000 | DeLong et al. | |
| 6,434,201 B1 | 8/2002 | Ohno et al. | |
| 6,438,159 B1 | 8/2002 | Uber | |
| 6,462,852 B1 | 10/2002 | Paschal et al. | |
| 6,496,911 B1 | 12/2002 | Dixon et al. | |
| 6,570,915 B1 | 5/2003 | Sweitzer et al. | |
| 6,606,576 B2 * | 8/2003 | Sessions | ............... G06F 13/423 702/107 |
| 6,704,351 B1 | 3/2004 | Ott et al. | |
| 6,775,328 B1 | 8/2004 | Segaram | |
| 6,879,455 B2 | 4/2005 | Ngo et al. | |
| 7,039,118 B1 | 5/2006 | Segaram | |
| 7,092,449 B2 | 8/2006 | Segaram | |
| 7,203,460 B2 | 4/2007 | Boose et al. | |
| 7,269,357 B2 | 9/2007 | Case et al. | |
| 7,408,995 B2 | 8/2008 | Segaram | |
| 7,483,699 B2 | 1/2009 | Karmi et al. | |
| 7,522,671 B2 | 4/2009 | Kiamilev et al. | |
| 7,529,217 B2 | 5/2009 | Pister et al. | |
| 7,536,157 B2 | 5/2009 | Wood et al. | |
| 7,573,940 B2 | 8/2009 | Connor et al. | |
| 7,593,470 B2 | 9/2009 | Segaram | |
| 7,639,745 B2 | 12/2009 | Bonelli et al. | |
| 7,643,563 B2 | 1/2010 | Huang et al. | |
| 2002/0136357 A1 | 9/2002 | Suonsivu et al. | |
| 2003/0133415 A1 | 7/2003 | Kim et al. | |
| 2003/0137403 A1 * | 7/2003 | Carrender | ............ G06K 7/0008 340/10.4 |
| 2004/0022180 A1 | 2/2004 | Stolpman et al. | |
| 2004/0022544 A1 | 2/2004 | Case et al. | |
| 2004/0202254 A1 | 10/2004 | Segaram | |
| 2004/0205431 A1 | 10/2004 | Moore et al. | |
| 2005/0042996 A1 * | 2/2005 | Khlat | ................... H03L 7/0802 455/255 |
| 2005/0123028 A1 | 6/2005 | Cioffi et al. | |
| 2005/0195904 A1 | 9/2005 | Huang et al. | |
| 2005/0249126 A1 | 11/2005 | Chang et al. | |
| 2006/0153307 A1 | 7/2006 | Brown et al. | |
| 2006/0160551 A1 | 7/2006 | Matoba et al. | |
| 2006/0165186 A1 | 7/2006 | Segaram | |
| 2006/0188043 A1 | 8/2006 | Zerbe et al. | |
| 2006/0233279 A1 * | 10/2006 | Ryder | ................... H04L 25/028 375/296 |
| 2007/0099572 A1 | 5/2007 | Navaratnam et al. | |
| 2007/0127581 A1 | 6/2007 | Connor et al. | |
| 2007/0184787 A1 | 8/2007 | Wood et al. | |
| 2007/0279194 A1 | 12/2007 | Carrender et al. | |
| 2008/0049716 A1 | 2/2008 | Munguia et al. | |
| 2008/0205501 A1 | 8/2008 | Cioffi et al. | |
| 2009/0132888 A1 | 5/2009 | Bains et al. | |
| 2011/0119551 A1 | 5/2011 | Tsern et al. | |

OTHER PUBLICATIONS

Dally et al., "Transmitter Equalization for 4-Gbps Signaling," IEEE Micro, vol. 17, No. 1, Jan./Feb. 1997, pp. 48-56. 9 pages.
Froelich, Dan, "Gen2 PCIe Electrical Specification Overview," PCI-SIG, slide show presentaion, Digital Enterprise Group, Intel, PCIe Technology Seminar 2005. 50 pages.
Froelich, Dan, "PCI Express 2.0 Electrical Specification Overview," PCI-SIG, Intel Corporation, Slideshow Presentation, APAC PCIe Technical Seminar 2006. 34 pages.
International Search Report and Written Opinion dated Oct. 17, 2008 in International Application No. PCT/US2007/087027. 21 pages.
JEDEC, "JEDEC Standard, DDR2 SDRAM Specification", JESD79-2B (Revision of JESD79-2A), JEDEC Solid State Technology Association, Jan. 2005, 113 Pages.
PCI Express, "PCI Express Base Specification" Revision 2.0, Dec. 20, 2006. 608 pages.
Request for Inter Partes Reexamination Under 35 U.S.C. for U.S. Pat. No. 7,330,952 dated Jun. 4, 2009. 98 pages.
Sharma, Debendra Das, "PCIe 2.0 Logical PHY Architecture," PCI-SIG, Slideshow Presentation, PCI-SIG APAC PCIe Technology Seminar 2006. 33 pages.
Widmer et al., "Single-Chip 4×500-MBd CMOS Transceiver," IEEE Journal of Solid-State Circuits, vol. 31, No. 12, Dec. 1996, pp. 2004-2014. 11 pages.

* cited by examiner

INTERFACE WITH VARIABLE DATA RATE

RELATED APPLICATIONS

This is a continuation of U.S. patent application Ser. No. 15/393,234, filed Dec. 28, 2016, which is a continuation of U.S. patent application Ser. No. 14/931,652, filed Nov. 3, 2015, now U.S. Pat. No. 9,569,396, which is a continuation of U.S. patent application Ser. No. 14/507,743, filed Oct. 6, 2014, now U.S. Pat. No. 9,178,647, which is a continuation of U.S. patent application Ser. No. 13/633,076, filed Oct. 1, 2012, now U.S. Pat. No. 8,855,217, which is a continuation of U.S. patent application Ser. No. 12/518,781, filed Dec. 21, 2009, now U.S. Pat. No. 8,279,948, which is a United States National Stage Application filed under 35 U.S.C. § 371 of PCT Patent Application Serial No. PCT/US2007/087027, filed on Dec. 10, 2007, which claims the benefit of and priority to U.S. Provisional Patent Application Ser. No. 60/869,896 filed on Dec. 13, 2006 and U.S. Provisional Patent Application Ser. No. 60/869,895 filed on Dec. 13, 2006, all of which are hereby incorporated by reference in their entireties.

FIELD

The subject matter disclosed herein relates generally to circuits for use in integrated circuits, and in particular, to circuits and associated methods for determining a range of data rates of an interface that is consistent with a specified data error rate.

BACKGROUND

Many devices and systems include circuits that are designed based on target performance characteristics. Unfortunately, these circuits may not always meet these targets. For example, effects such as process variations during manufacturing, variations in a power supply voltage, variations in temperature, or even aging of a component may result in a distribution of performance characteristics, some of which may fall below the targets.

In the case of input/output (I/O) interfaces, a failure to achieve a target data rate often results in a complete failure of the device or system that includes the interface. An inability to adapt the data rate or to adjust one or more circuit parameters to achieve a desired data rate may, therefore, have consequences for overall yield, cost, lifespan and the reliability of the devices or systems.

There is a need, therefore, for improved I/O interfaces whose data rate may be adapted or adjusted without the aforementioned problems.

BRIEF DESCRIPTION OF THE DRAWINGS

For a better understanding, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
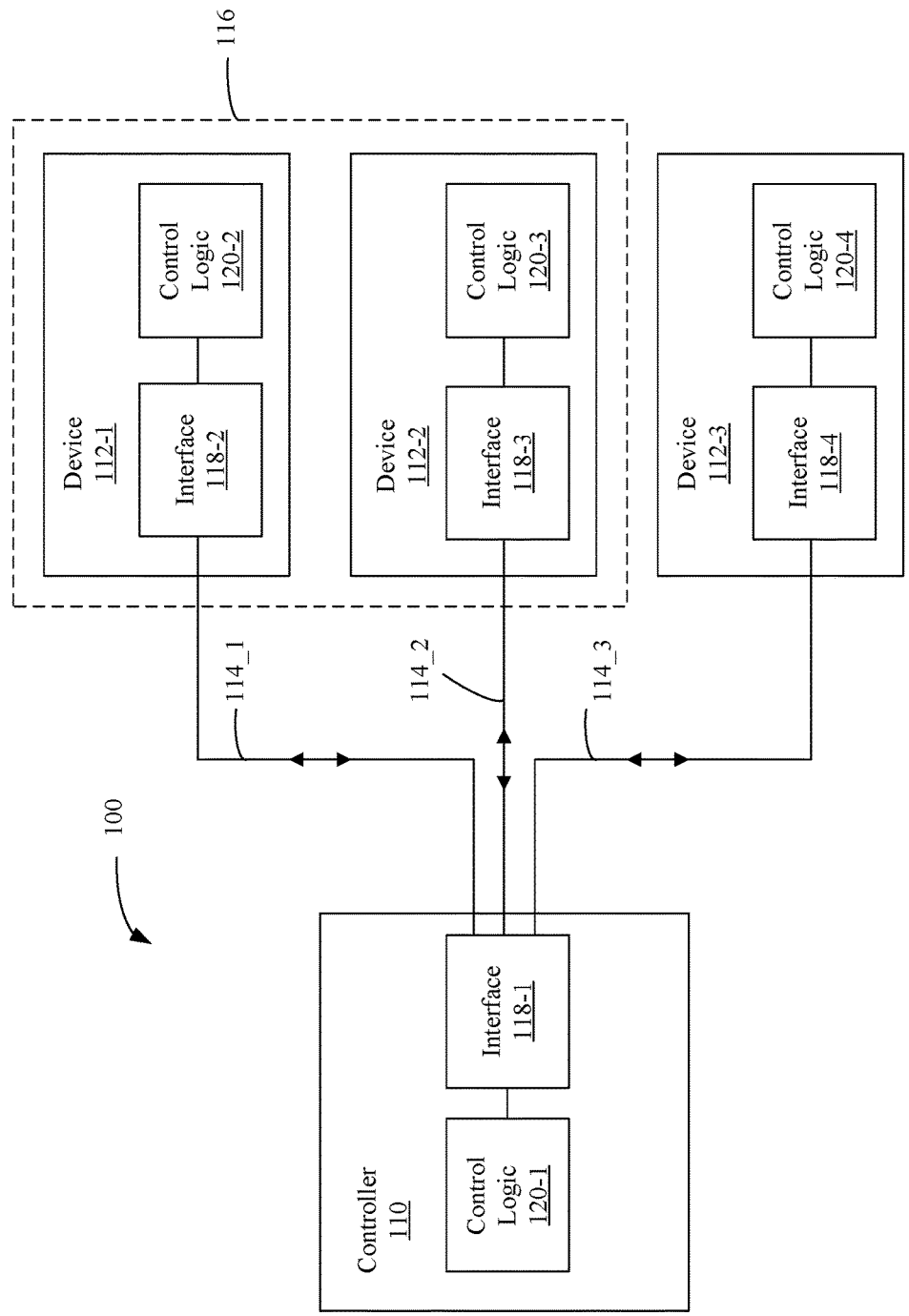
FIG. 1 is a block diagram illustrating an embodiment of a system having a plurality of devices coupled to a controller.

Embodiments of a device are described. The device includes a transmitter coupled to a node, where the node is to couple to a wired link. The transmitter has a plurality of modes of operation including a calibration mode in which a maximum data rate of communication of information over the wired link is determined in accordance with a voltage margin corresponding to the wired link at a predetermined error rate (e.g., a maximum acceptable error rate). The maximum data rate is a non-integer multiple of a data clock frequency.

A method for determining the maximum data rate of communication over the wired link in a calibration mode of operation includes determining a voltage margin at a receive circuit while receiving data transmitted over the wired link at an initial data rate. The voltage margin is determined iteratively at a sequence of gradually increasing data rates until a respective voltage margin corresponds to an error rate that is greater than a predetermined error rate. The data rate increment between iterations is a non-integer multiple of the initial data rate. The maximum data rate can be a non-integer multiple of an initial data rate.

In some embodiments, the maximum data rate is further determined in accordance with a timing margin corresponding to the wired link at the predetermined error rate.

In some embodiments, the transmitter includes a fractional-N phase locked loop. In some embodiments, the device includes a microprocessor.

The device may optionally include control logic to determine the maximum data rate using an iterative process in which the data rate is increased until a measured voltage margin corresponds to an error rate that is greater than the predetermined error rate. Optionally, the control logic may also be configured to modify a supply voltage and/or a voltage swing of a transmit circuit in the transmitter if the maximum data rate is less than a target data rate.

Optionally, the transmitter may report determined values of the data rate and corresponding voltage margins to a system that includes the device. Optionally, the transmitter may include a loop back path between a transmit circuit and a calibration circuit during the calibration mode.

The present invention may be implemented in a system that includes a first device having a transmit circuit, a second device that includes a receive circuit, and a wired link coupled to transmit and receive circuits.

Reference will now be made in detail to embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

Circuits, such as interfaces, and related methods are described. A maximum data rate of communication of information over a wired link coupled to a respective circuit may be determined in an iterative process by control logic. The maximum data rate may correspond to a predetermined error rate (such as a bit error rate or BER), and may be determined using a voltage margin and/or a timing margin. The maximum data rate may be a non-integer multiple (e.g., a value between one and two) of an initial data rate.

In some embodiments, a voltage margin of the circuit is predicted by determining voltage margins at a first error rate and at a second error rate. For example, offset voltages may be applied to a receive circuit in the circuit, thereby changing the threshold of the receive circuit. For a respective error rate, the voltage margin corresponds to the offset voltage that degrades the error rate sufficiently that it approximately equals the respective error rate. Two or more of these voltage margins may be used to determine a noise metric, such as an rms noise. In conjunction with a measured or predetermined relationship between a signal-to-noise ratio and the error rate, the rms noise and the first error rate may be used to predict the voltage margin at a third error rate. Typically, the first and second error rates are larger than the third error rate, perhaps by several orders of magnitude. In this way, measurements may be performed in a reasonable amount of time and the results of these measurements may be used to predict performance of the circuit at lower error rates.

By determining a range of data rates between an initial data rate and a maximum data rate of a link (corresponding to a specified error rate), the circuit may be adjusted and/or adapted. In some embodiments, a supply voltage and/or a voltage swing of a transmit circuit is adjusted if the maximum data rate is different than a target data rate. For example, the supply voltage may be increased if the maximum data rate is less than the target data rate, or the supply voltage may be decreased if the maximum data rate is more than the target data rate. The ability to determine a range of data rates of the link for a specified error rate, and/or to adjust the circuit based on the maximum data rate may offer improved yield, improved performance (such as data rate and/or power management), and/or reduced cost. In some embodiments, the supply voltage for the entire interface (e.g., including a PLL as well as the transmit circuit, and optionally additional interface circuitry as well) is adjusted in accordance with the criteria stated above.

The circuit may include a memory controller and/or a memory device. The memory device may include a memory core that utilizes solid-state memory, semiconductor memory, organic memory and/or another memory material, including volatile and/or non-volatile memory. The memory device may include dynamic random access memory (DRAM), static random access memory (SRAM) and/or electrically erasable programmable read-only memory (EEPROM). The circuit may be included in one or more components in a memory system, such as a memory controller and/or one or more memory devices. The one or more memory devices may be embedded in one or more memory modules. The memory controller and the one or more memory devices may be on a common or same circuit board. The circuit may be included in one or more components in other systems, such as those that include logic chips, including a serializer/deserializer, PCI Express and/or other high-speed interfaces (such as serial links) or input/output links. The circuit may be included in a microprocessor and/or a motherboard for a computer.

Attention is now directed towards embodiments that address the difficulties associated with the existing interface circuits described previously. FIG. 1 is a block diagram illustrating an embodiment of a system 100. The system 100 includes at least one controller 110 and one or more devices 112, such as one or more memory devices. While FIG. 1 illustrates the system 100 having one controller 110 and three devices 112, other embodiments may have additional controllers and fewer or more devices 112. Also, while the system 100 illustrates the controller 110 coupled to multiple devices 112, in other embodiments two or more controllers may be coupled to one another. The controller 110 may include control logic 120-1 and an I/O interface 118-1. Optionally, one or more of the devices 112 may include control logic 120 and at least one of interfaces 118. In some embodiments, some of the devices 112 may not have control logic 120 and/or the interfaces 118. In some embodiments, the controller 110 and/or one or more of the devices 112 may include a plurality of the interfaces 118, which may optionally share control logic 120. In embodiments where the devices 112 are memory devices, two or more of the devices, such as devices 112-1 and 112-2, may be configured as a memory bank 116.

The controller 110 and the devices 112 are connected by one or more links 114. While the system 100 illustrates three links 114, other embodiments may have fewer or more links 114. In some embodiments, the links 114 correspond to wired communication links. The links 114 may be used for bi-directional and/or uni-directional communications between the controller 110 and one or more of the devices 112. Bi-directional communication may be simultaneous. In some embodiments, one or more of the links 114 and corresponding transmit circuits (illustrated in FIG. 3A) and/or receive circuits (illustrated in FIGS. 3A and 3B) may be dynamically configured, for example, by the control logic 120 of a controller 110, for bi-directional and/or unidirectional communication.

One or more of the control logic 120 circuits may be used to determine the maximum data rate of communication of information over at least one of the links 114. The control logic 120 circuits may allow improved performance (increased data rates and/or reduced power consumption), as well as lower cost of the system 100.

Figure 2A:
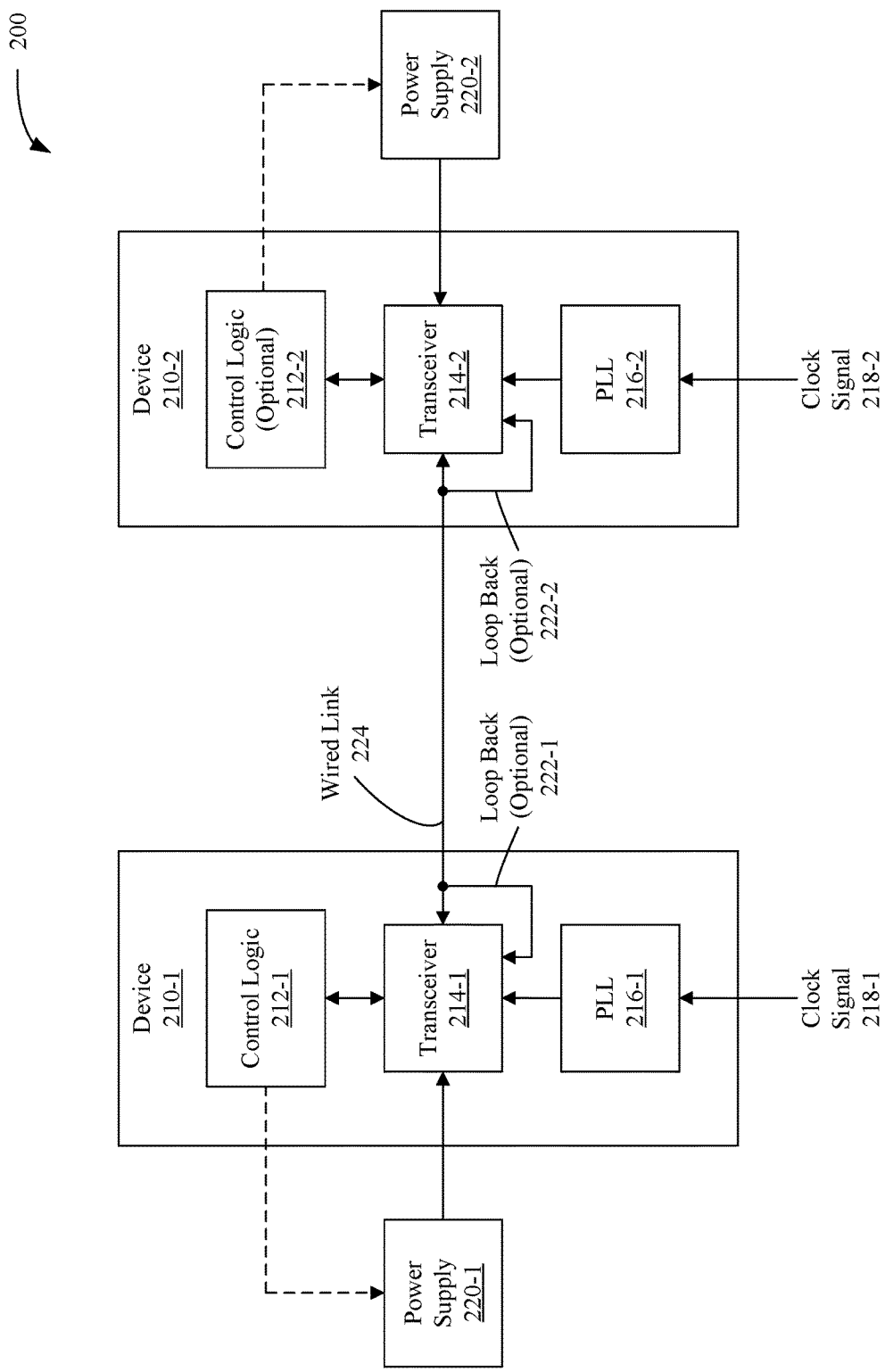
FIG. 2A is a block diagram illustrating an embodiment of a system having two devices interconnected by a wired link.

FIG. 2A is a block diagram illustrating an embodiment of a system 200. The system 200 includes a device 210-1 coupled to device 210-2 via a wired link 224. Each of the devices 210 includes at least one transceiver 214 to transmit and receive data on the wired link 224 at a variable and/or an adjustable data rate. Note that in the discussion that follows, data rate is taken to be a physical transmission frequency, as opposed to an effective data rate such as that used in systems where dropped packets are retransmitted. The transceivers 214 may transmit and/or receive the data using clock signals provided by one of the phase locked loops (PLL) 216. The phase locked loops 216 may generate the clock signals using primary or reference clock signals

218. In an exemplary embodiment, the phase locked loops 216 include fractional-N phase locked loops and/or sigma-delta phase locked loops. Such phase locked loops allow the data rate to be a non-integer multiple of the reference clock frequency. Each of the transceivers 214 is also coupled to one of the power supplies 220, which provides one or more supply voltages.

At least one of the devices 210 includes control logic 212. One or more of the control logic 212 circuits may be used to determine a maximum data rate of communication of information over a communication channel that includes the wired link 224 and one or more of the transceivers 214 in a calibration mode of operation. The communication channel may include a physical layer, such as the wired link 224, and a data layer in protocol stacks in one or more of the devices 210. In some embodiments, the maximum data rate is determined based on communication over the wired link 224. For example, data is transmitted by transceiver 214-1 at a data rate over the wired link 224, and this data is received by transceiver 214-2 in the device 210-2. The data may then be transmitted back to device 210-1 where an error rate is determined or inferred (for example, based on a voltage or timing margin). Alternatively, the error rate is determined or inferred in the device 210-2, and the results may be communicated back to device 210-1.

In other embodiments, during the calibration mode of operation one of optional loop backs 222 may couple a transmit circuit to a receive circuit in a respective transceiver, such as transceiver 214-1. Note that the loop backs 222 may allow device-related issues in a communication channel to be isolated. The receive circuit may include a calibration circuit that is used to determine a performance metric, such as the error rate, voltage margin and/or timing margin. In this way, the respective transceiver may be used to determine, either directly (by measurement) or indirectly (using the voltage and/or timing margins), the error rate corresponding to the data rate. In some embodiments, characteristics of the optional loop backs 222 (such as an impedance and/or a length) are selected to mimic the characteristics of the wired link 224.

One or more of the control logic 212 circuits may determine the maximum data rate of communication over the wired link 224 using an auto-negotiation procedure. An initial or safe data rate may be used, such as 80% of a target data rate. The performance of the wired link 224, such as a voltage and/or timing margin that corresponds to a predetermined error rate, may be determined. (This process is described further below with reference to FIGS. 4, 5 and 7).

After determining the performance, the data rate is increased (e.g., by increasing the PLL output frequency by a fraction of the initial PLL output frequency) and the process is repeated iteratively until the wired link 224 fails, i.e., the performance is insufficient. For example, the wired link 224 is deemed to have failed when the determined voltage margin and/or timing margin correspond to an error rate that is larger than the predetermined error rate. When this occurs, one or more of the control logic 212 circuits determines the maximum data rate as the last or highest data rate that had acceptable performance. In an exemplary embodiment, the maximum data rate is less than twice the initial data rate in the auto-negotiation procedure. In another exemplary embodiment, the maximum data rate is up to 1.5 times the initial data rate.

One or more of the control logic 212 circuits may report the maximum data rate, as well as the measured voltage and/or timing margin as a function of the data rate, to a host in the system 200. In some embodiments, the host is one or more of the control logic 212 circuits, such as control logic in a memory controller. In some embodiments, the host is a microprocessor. The host may use this information to adapt and/or adjust one or more of the transceivers 214. For example, if performance is important, a maximum data rate of one or more of the transceivers 214 may be selected by setting one or more register values in the corresponding phase locked loops 216. Alternatively, if power is a constraint, a data rate lower than the maximum data rate may be used. In some embodiments, the control logic enables continued operation of a transmitter even if the maximum data rate is less than a target data rate. For example, continued operation may be permitted so long as the maximum data rate is within a predefined percentage (e.g., 1%, 2% or 5%) of the target data rate.

In other embodiments, a supply voltage and/or a transmit voltage swing of one or more of the transceivers 214 may be adjusted. The former is illustrated by the dashed lines in FIG. 2A. For example, if the determined maximum data rate is greater than the target data rate, the supply voltage and/or the voltage swing may be reduced. Alternatively, if the determined maximum data rate is less than the target data rate, the supply voltage and/or the voltage swing may be increased. The adjustment of the supply voltage and/or the voltage swing may be based on a known relationship between the maximum data rate and the voltage swing or the supply voltage (for example, the maximum data rate is proportional to the square root of the supply voltage), or such a relationship(s) may be measured.

Using this approach, the host may adjust and/or adapt performance in accordance with constraints on the data rate and/or power consumption. For example, since many communication channels are over designed in order to meet worst-case conditions, non-worst-case channels may be operated with a lower supply voltage and/or voltage swing. Alternatively, data rates below the maximum may be used, thereby improving a communication channel that is failing. Furthermore, systems and devices, such as the system 200 and the devices 210, may be binned (e.g., assigned to predefined device grades) based on their maximum data rates. In other embodiments, the auto-negotiation may improve convergence in communication channels that use decision feedback equalization (DFE), may enable advanced system diagnostics, and/or may allow a frequency profile of the communication channel to be determined. In another embodiment, the host may determine that the maximum data rate is close enough to the target data rate (or another system constraint) and choose to do nothing, i.e., to make no changes to the system 200 at a given time.

The auto-negotiation procedure may be performed once or multiple times. For example, the auto-negotiation procedure may be performed when the system 200 is manufactured, at boot time (when the system 200 is powered on), or dynamically. Dynamic adjustment may occur after a predetermined time interval or as needed, such as when the performance of the communication channel is insufficient.

In an illustrative embodiment, the auto-negotiation procedure determines the maximum data rate in the range of 8-15 Gbps about a 10 Gbps target, using data rate increments of 5%. In another illustrative embodiment, the auto-negotiation procedure determines the maximum data rate in the range of 8-12 Gbps using 100 Mbps increments. In yet another illustrative embodiment, a PCI Express interface in a portable motherboard fails (i.e., has too large of an error rate) at a data rate 2.5 Gbps. Based on a determined maximum data rate, the motherboard may be used at 2.25

Gbps or may be used at 2.5 Gbps in conjunction with a higher supply voltage or voltage swing.

Figure 2B:
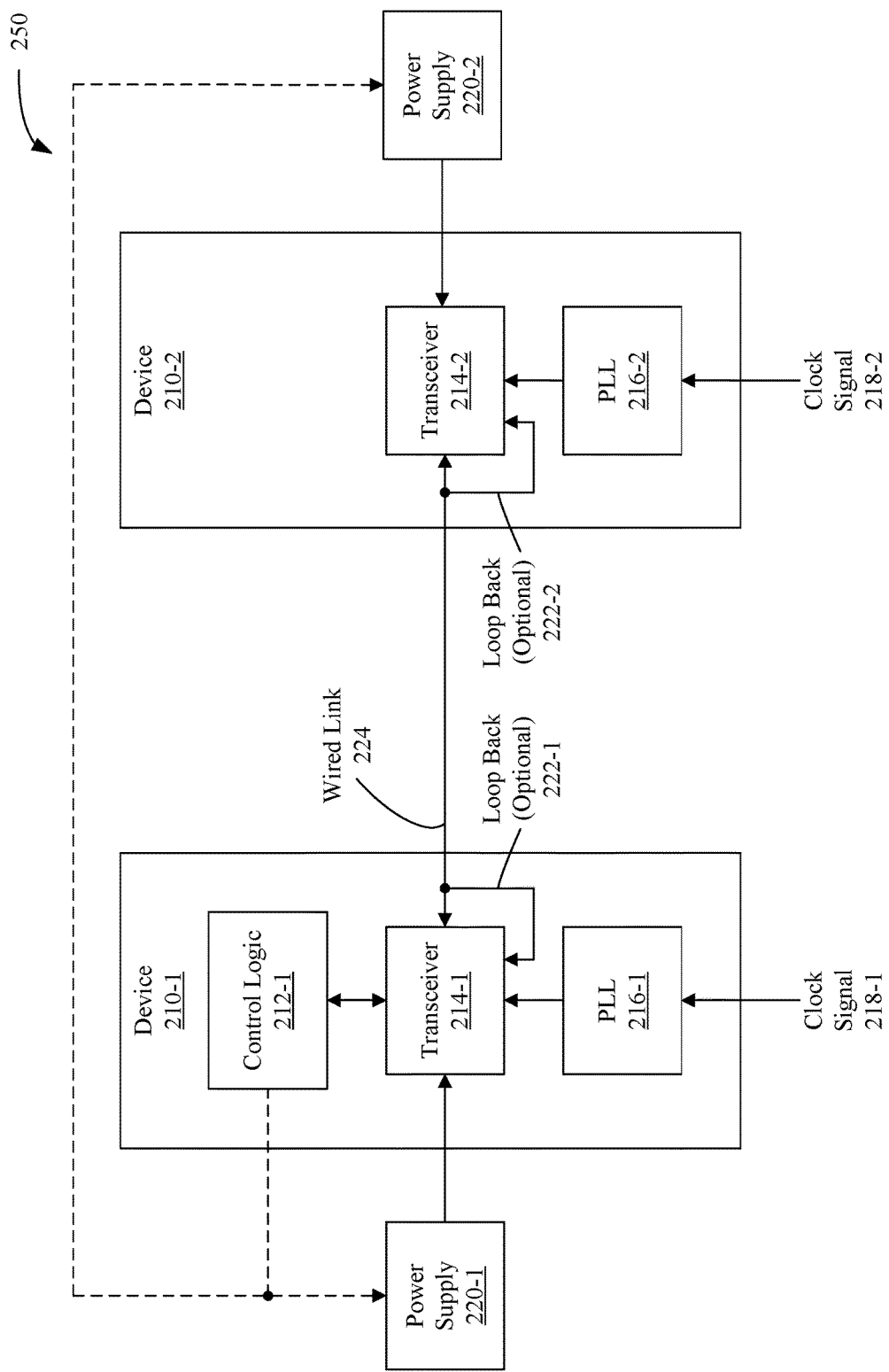
FIG. 2B is a block diagram illustrating another embodiment of a system having two devices interconnected by a wired link.

In some embodiments, the system 200 may include fewer or additional components, logical positions of one or more components in the system 200 may be changed, and two or more of the components may be combined and/or shared. For example, in some embodiments clock signals 218 are a common clock signal. Or in some embodiments only one of the devices 210 includes control logic. This is illustrated in embodiment 250 in FIG. 2B.

Figure 3A:
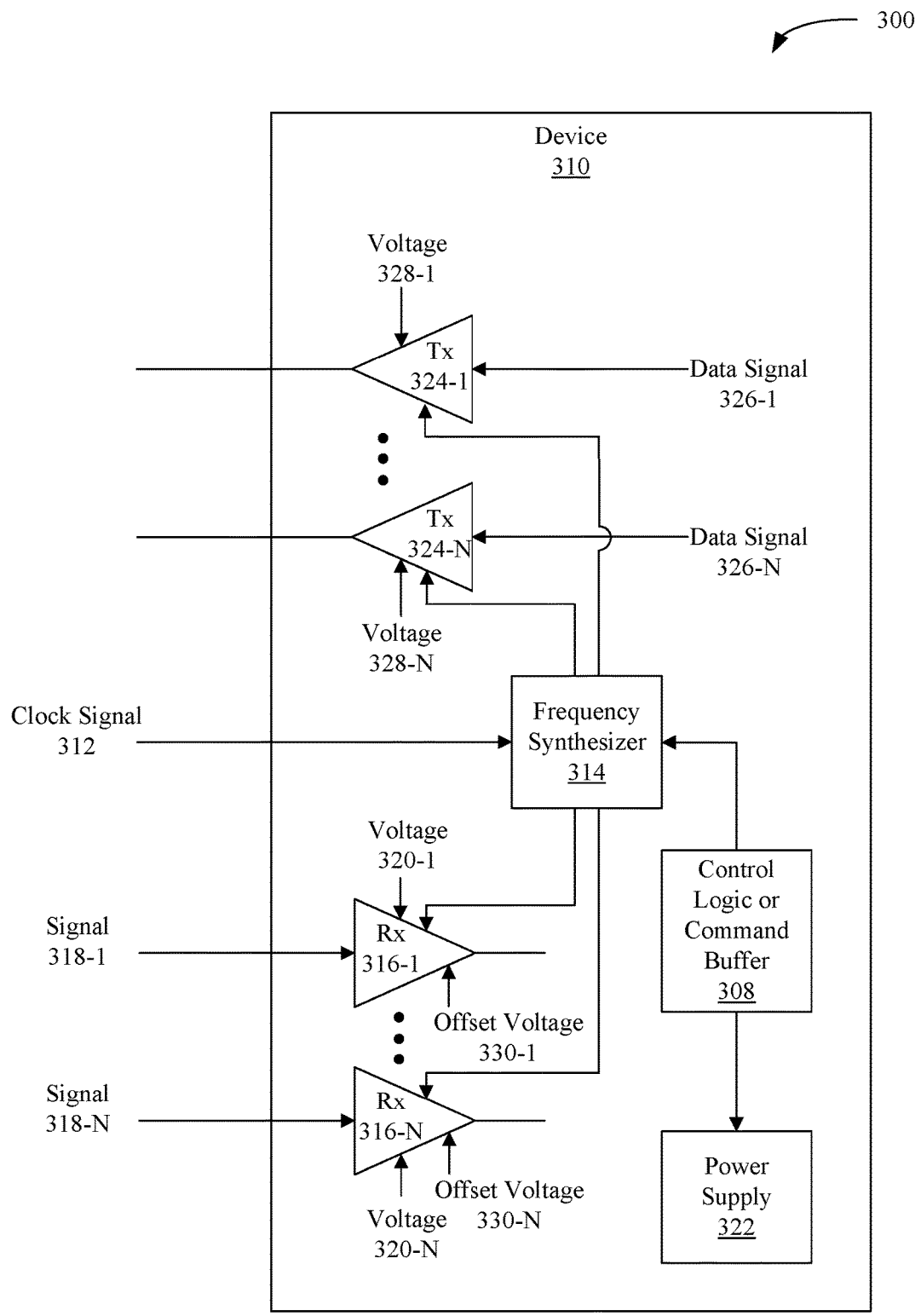
FIG. 3A is a block diagram illustrating an embodiment of a device having a receiver.

FIG. 3A is a block diagram illustrating an embodiment 300 of a device 310. The device 310 receives a clock signal 312, such a reference clock signal. A frequency synthesizer 314, which may include a fractional-N phase locked loop, generates clock signals that determine transmit times of transmit circuits 324 and sampling times of receive circuits 316. The transmit circuits 324 output baseband signals having a voltage swing (not shown) that correspond to data signals 326 using supply voltages 328. The receive circuits 316 output data signals corresponding to received signals 318 using supply voltages 320. The supply voltages 320 and 328 may be provided by a power supply 322. Furthermore, the receive circuits 316 and the transmit circuits 324 may be included in an interface circuit.

Offset voltages 330 may be applied to the receive circuits 316 to adjust one or more thresholds of the receive circuits 330. For receive circuits 316 that receive a baseband signal that includes binary data, there is one threshold per receive circuit, while receive circuits that receive symbols that represent more than one bit per symbol (e.g., symbols transmitted using 4-level pulse amplitude modulation) there may be two or more thresholds. This adjustment capability may be used to trim variations in the thresholds and/or to determine a voltage margin of a communication channel. Determining such a voltage margin is discussed further below with reference to FIGS. 3B, 4A and 4B.

The device 310 may include control logic or a command buffer 308. In embodiments with a command buffer, command instructions from a host or another device that includes control logic may be received by such a command buffer. The control logic or command buffer 308 may provide signals that adjust the data rate of one or more of the transmit circuits 324 (for example, by changing a register in the frequency synthesizer 314), the voltage swing of one or more of the transmit circuits 324, and/or one or more of the supply voltages 320 and 328. For example, one or more of the supply voltages 320 and 328 may be changed by modifying a setting in the power supply 322.

Figure 3B:
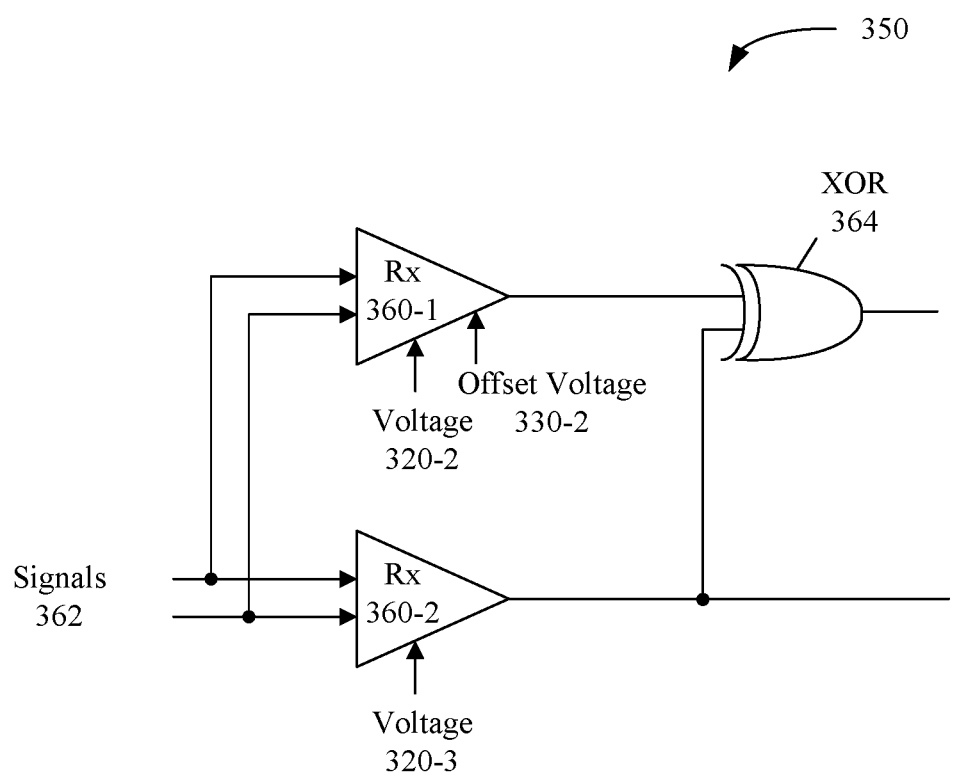
FIG. 3B is a block diagram illustrating an embodiment of a receiver.

FIG. 3B is a block diagram illustrating an embodiment of a receiver 350. In contrast with the receive circuits 316 in the device 310 (FIG. 3A), the receive circuits 360 are differential, i.e., they each are configured to receive baseband differential signals 362. The receive circuits 360 using supply voltages 320. In this embodiment, the receiver 350 includes two receive circuits 360. Receive circuit 360-2 receives the differential signals 362 and outputs data signals. A threshold of receive circuit 360-1, however, may be adjusted using offset voltage 330-2. If the offset voltage 330-2 exceeds a voltage margin of a communication channel, data signals output by the receive circuit 360-1 may differ from those output by receive circuit 360-2. The data signals output by the receive circuits 360-1 and 360-2 are compared using XOR circuit 364. By sweeping the offset voltage 330-2 and detecting differences between the outputs from the receive circuits 360, the receiver 350 may be used to determine the voltage margin at a given error rate. This is discussed further below with reference to FIGS. 4A and 4B.

In some embodiments, the device 310 and/or the receiver 350 may include fewer or additional components, logical positions of one or more components may be changed, and two or more of the components may be combined and/or shared.

Figure 4A:
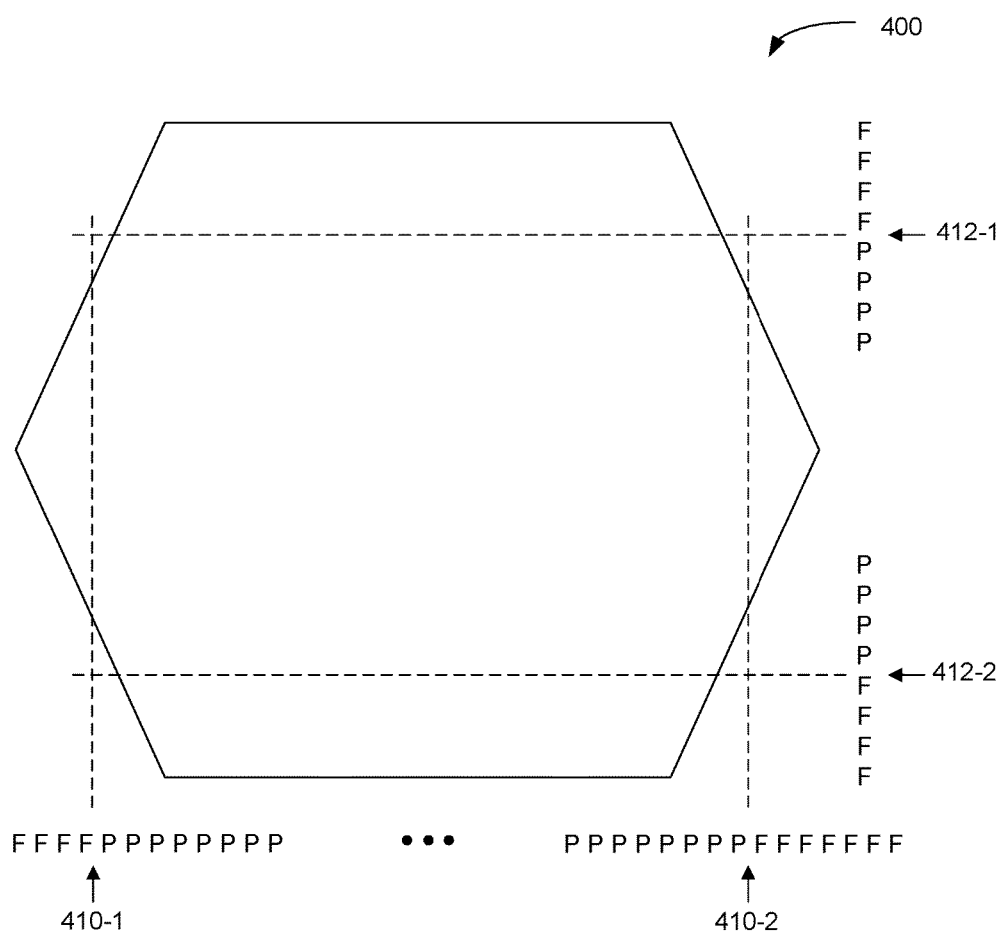
FIG. 4A illustrates an eye pattern.
Figure 5:
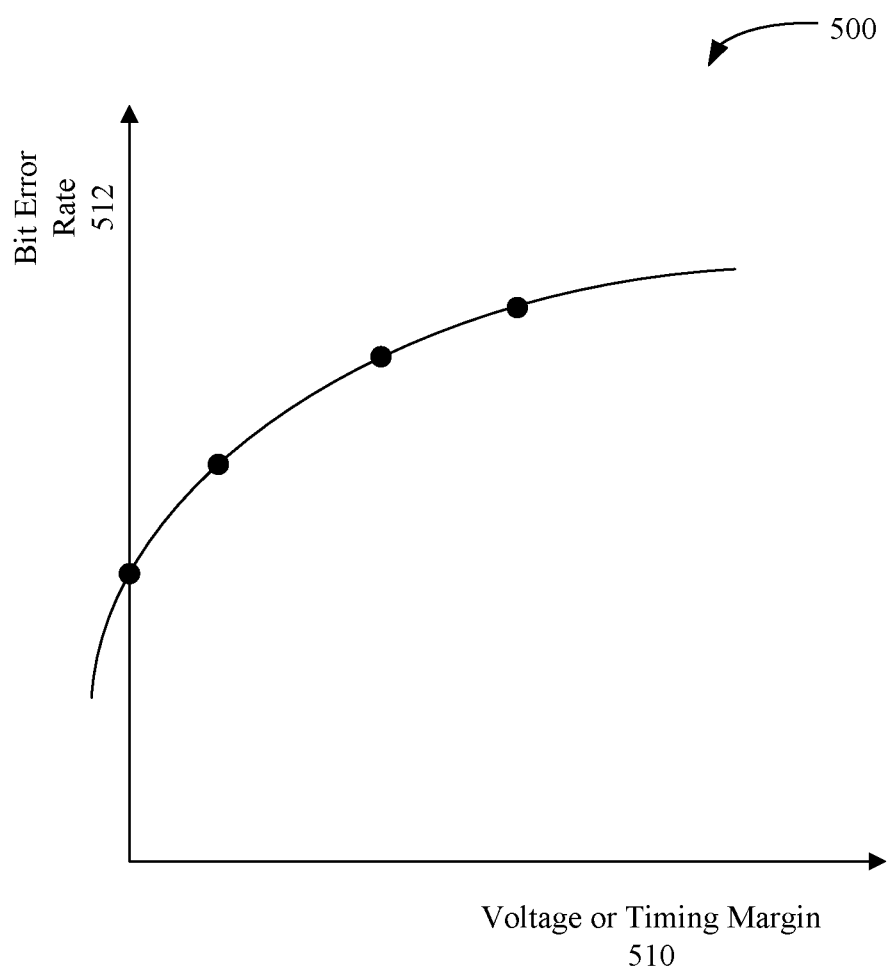
FIG. 5 illustrates an embodiment of a relationship between error rate and a voltage or timing margin.

FIG. 4A illustrates an eye pattern 400. The eye pattern 400 corresponds to a pattern of baseband signals received by a receive circuit, such as one of the receive circuits 316 (FIG. 3A), via one of the links 114 (FIG. 1). By adjusting the phase of one or more clock signals that are generated by the frequency synthesizer 314 (FIG. 3A), such as the clock signal used to determine a transmit time for one of the transmit circuits 324 (FIG. 3A) and/or the clock signal that determines a sampling time of one of the receive circuits 316 (FIG. 3A), the phase of a received baseband signal may be swept across the eye pattern 400. Typically, only a subset of the phases will result in an acceptable BER. Phases that yield an acceptable BER may be labeled as passing (P) and phases that yield an unacceptable BER may be labeled as failing (F). The range of allowed phases (i.e., phases with acceptable BER) typically includes a central portion of the eye pattern 400. The range of allowed phases has a left-hand or fail-pass (FP) boundary 410-1 and a right-hand or pass-fail (PF) boundary 410-2 that define a timing margin.

Furthermore, as discussed above with reference to FIG. 3B, by adjusting an offset voltage applied to at least one of the receive circuits 360 (FIG. 3B) or 316 (FIG. 3A), a threshold voltage may be swept across the eye pattern 400 in a vertical direction, in a sequence of steps. Sweeping the threshold voltage by varying the offset voltage across a range of offset voltages (e.g., in a sequence of steps) is sometimes referred to as a voltage schmoo. Once again, typically only a subset of the threshold voltages will result in an acceptable BER. Voltages that yield an acceptable BER may be labeled as passing (P) and voltages that yield an unacceptable BER may be labeled as failing (F). The range of allowed voltages (i.e., voltages with acceptable BER) typically includes a central portion of the eye pattern 400. The range of allowed voltages has an upper or fail-pass (FP) boundary 412-1 and a lower or pass-fail (PF) boundary 412-2 that define a voltage margin. Note that in some circuits or systems, the voltage and the timing margins are related to one another, for example, linearly.

Communication channels are usually designed to have a low error rate under nominal operating conditions. As a consequence, it is often difficult to measure these error rates directly because error events are infrequent (e.g., error rates under nominal operating conditions may be less than $10^{-12}$). Thus, data error rate (e.g., bit error rate) measurements are often time consuming. In some embodiments, offset voltages may be used to degrade the performance of the communication channel, i.e., to increase the error rate. Using measured offset voltages at different error rates, predictions of offset voltages and/or voltage margins at other error rates may be determined. Such predictions may be based on a known relationship between the error rate and the signal-to-noise ratio of the communication channel. In some embodiments, this relationship is measured and stored as a calibration curve for use in such analysis.

Figure 4B:
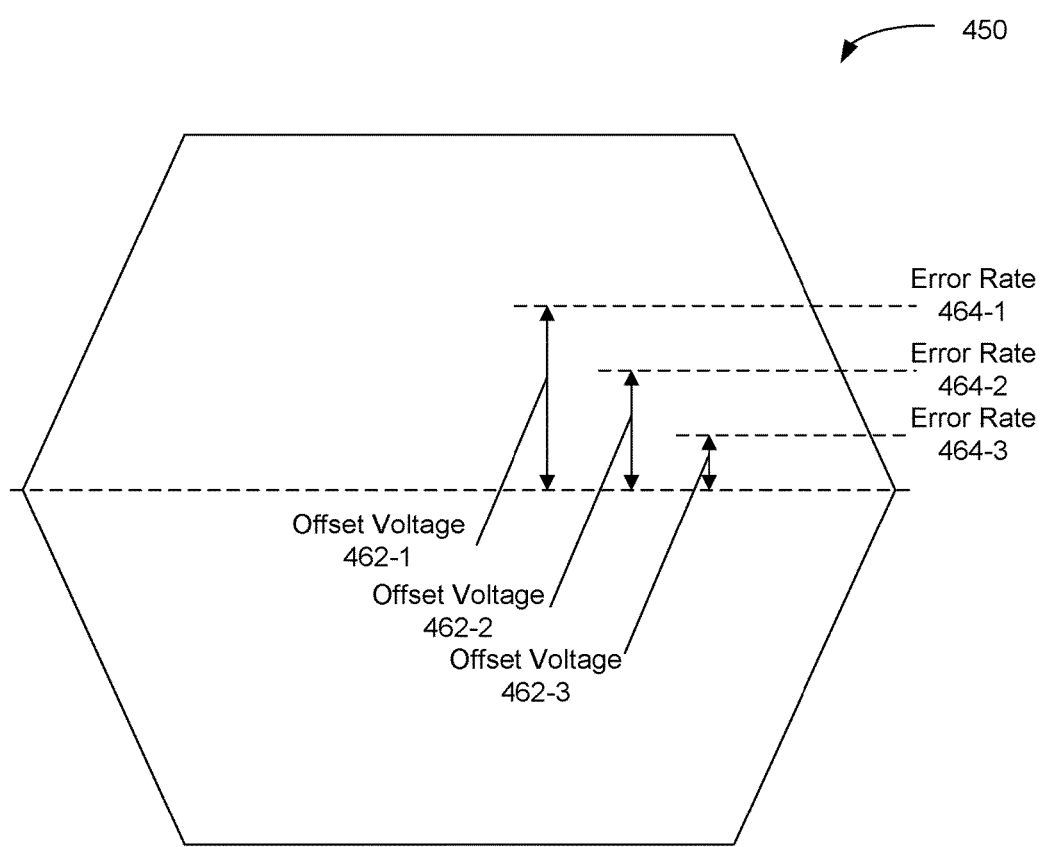
FIG. 4B illustrates a plurality of error rates and associated offset voltages with respect to an eye pattern.

A technique for predicting voltage margin as function of the data error rate, or vice-versa, is illustrated in FIG. 4B, which shows an eye pattern 450 and a set of offset voltages 462. A first offset voltage 462-1 corresponding to a first error rate 464-1 is determined, and second offset voltage 462-2 corresponding to a second error rate 464-2 is determined. Furthermore, a noise metric, such as an rms noise, is determined using the first offset voltage and the second offset voltage, as will be described in more detail below. After the noise metric has been determined, a third offset voltage 462-3 corresponding to a third error rate 464-3 is predicted. For example, the third offset voltage 462-3 may correspond to a very low error rate (e.g., $10^{-12}$ or $10^{-13}$) that would otherwise be very time consuming to directly measure.

The noise metric and the prediction of the third offset voltage 462-3 is based on an established relationship between the error rate and the signal-to-noise ratio. For some systems or circuits, the relationship between the error rate and the signal-to-noise ratio is $$ER = 0.5 \; \text{erfc}\left(\frac{V_{SNR}}{\sqrt{2}}\right), \qquad (1)$$

where ER is the error rate, erfc( ) is a complementary error function, and $V_{SNR}$ is the voltage ratio of signal to RMS noise (and thus $V_{SNR}$ is a signal-to-noise ratio). In other embodiments, the relationship may be based on colored noise and/or one or more dominant error events, as is known in the art. The voltage signal-to-noise ratio $V_{SNR}$ may be defined as $$V_{SNR} = \frac{\text{signal voltage}}{\text{rms noise voltage}}$$

The complementary error function erfc(z), used in Equation 1, is typically defined as $$\text{erfc}(z) = \frac{2}{\sqrt{\pi}} \int_{z}^{\infty} e^{-t^2} dt$$

although other definitions may be used in other embodiments.

In some embodiments, the third offset voltage is determined in accordance with the first and second voltages and the noise metric. For example, a noise metric N may be determined by the first and second offset voltages in accordance with a function of the form:

$$N=(V1-V2)/\beta$$

where V1 is the first offset voltage, corresponding to the higher of the first and second error rates (e.g., $10^{-3}$), V2 is the second offset voltage, corresponding to the lower of the first and second error rates (e.g., $10^{-6}$), and β is a coefficient determined in accordance with the first and second error rates. In some embodiments, a ratio of the first error rate to the second error rate is at least 100. In an exemplary embodiment, the first error rate 464-1 is $10^{-3}$, the second error rate 464-2 is $10^{-6}$, and the rms noise N (over an effective bandwidth of the communication channel) equals approximately $$N = \frac{V1 - V2}{1.7}, \qquad (2)$$

If a single measurement during a voltage schmoo takes 1 ms, at a data rate of 10 Gbps each measurement corresponds to $10^7$ bits. Receiving $10^7$ bits is sufficient to measure an error rate as low as $10^{-6}$, which would produce about 10 errors in $10^7$ bits. Further, if a binary search is used to determine a respective offset voltage, the full range of the voltage swing is 200 mV, and the voltage schmoo resolution is 2 mV, determining the respective offset voltage will take approximately 7 ms.

Once the rms noise N has been determined, the third offset voltage 462-3 corresponding to the target error rate (e.g., the third error rate 464-3) may be predicted by a function of the form:

$$V3=V2-\alpha N$$

where V2 and N are as defined above and a is a coefficient determined in accordance with the target error rate and the second error rate. For example, by taking the difference of the logarithm of Equation 1 for the second error rate 464-2 of $10^{-6}$ and the third error rate 464-3 of $10^{-12}$, the third offset voltage 464-3 is predicted to be approximately $$V2-2.3N, \qquad (3)$$

where N is the rms noise. The coefficient in Equation 3, above, is a function of the second and third error rates, and therefore the coefficient will have a value different from 2.3 if the second and third error rates differ from the second and third error rates (i.e., $10^{-6}$ and $10^{-12}$) used in this example.

In another embodiment, the analysis may be performed using both bounded and random (or pseudo-random) noise. In particular, measurement of the $V_1$ and $V_2$ offset voltages may performed at two data error rates (for example, $10^{-3}$ and $10^{-6}$, respectively) using a data pattern that has a fundamental frequency and a minimum amount of bounded noise. For example, if a periodic signal such as a clock signal is used as the data signal, the fundamental frequency of the data pattern is the clock frequency. In a communication channel where inter-symbol interference (ISI) is associated with reflections and dispersion in the channel, such a pattern may have reduced ISI. From these measurements, the rms noise metric N is determined in accordance with the methodology explained above (e.g., using Equation 2, if the first and second error rates are $10^{-3}$ and $10^{-6}$, respectively).

Next, measurement of another offset voltage V4 at the second error rate may be performed using a pseudo-random pattern, such as a pseudo-random sequence. Such a pattern may be a worst case pattern that has the maximum bounded noise. From the offset voltage measurement V4 at this error rate, the offset voltages V3 at other target error rates may be predicted, for example, using Equation 4:

$$V3=V4-\alpha N, \qquad (4)$$

where N is the rms noise metric that was previously determined using, for example, a periodic signal, and α is a coefficient whose value is determined in accordance with the second error rate and the target error rate. As noted above, α in Equation 4 is approximately 2.3 when the second error rate and the target error rates are $10^{-6}$ and $10^{-12}$, respectively.

As discussed previously, using measurements and/or equations a relationship 500 (illustrated in FIG. 5) between error rate 512 and voltage or timing margin 510 may be determined. This relationship 500 may be used to predict voltage or timing margin at other values of the error rate 512. Alternatively, the relationship 500 may be used to predict the error rate based on a measured voltage or timing margin at a given data rate. As such, the relationship 500 may be used during an auto-negotiation procedure. In some embodiments, therefore, a close-formed expression or a look-up table that includes data representing the relationship 500 may be stored in the controller 110 (FIG. 1) and/or one of the devices 112 (FIG. 1). In other embodiments, this information may be stored in a host that includes the controller 110 (FIG. 1) and/or one of the devices 112 (FIG. 1).

It is noted that when the predicted offset voltage V3 for a target error rate is negative, this means that target error rate cannot be achieved (i.e., cannot be achieved using the circuitry on which measurements were taken).

Figure 6A:
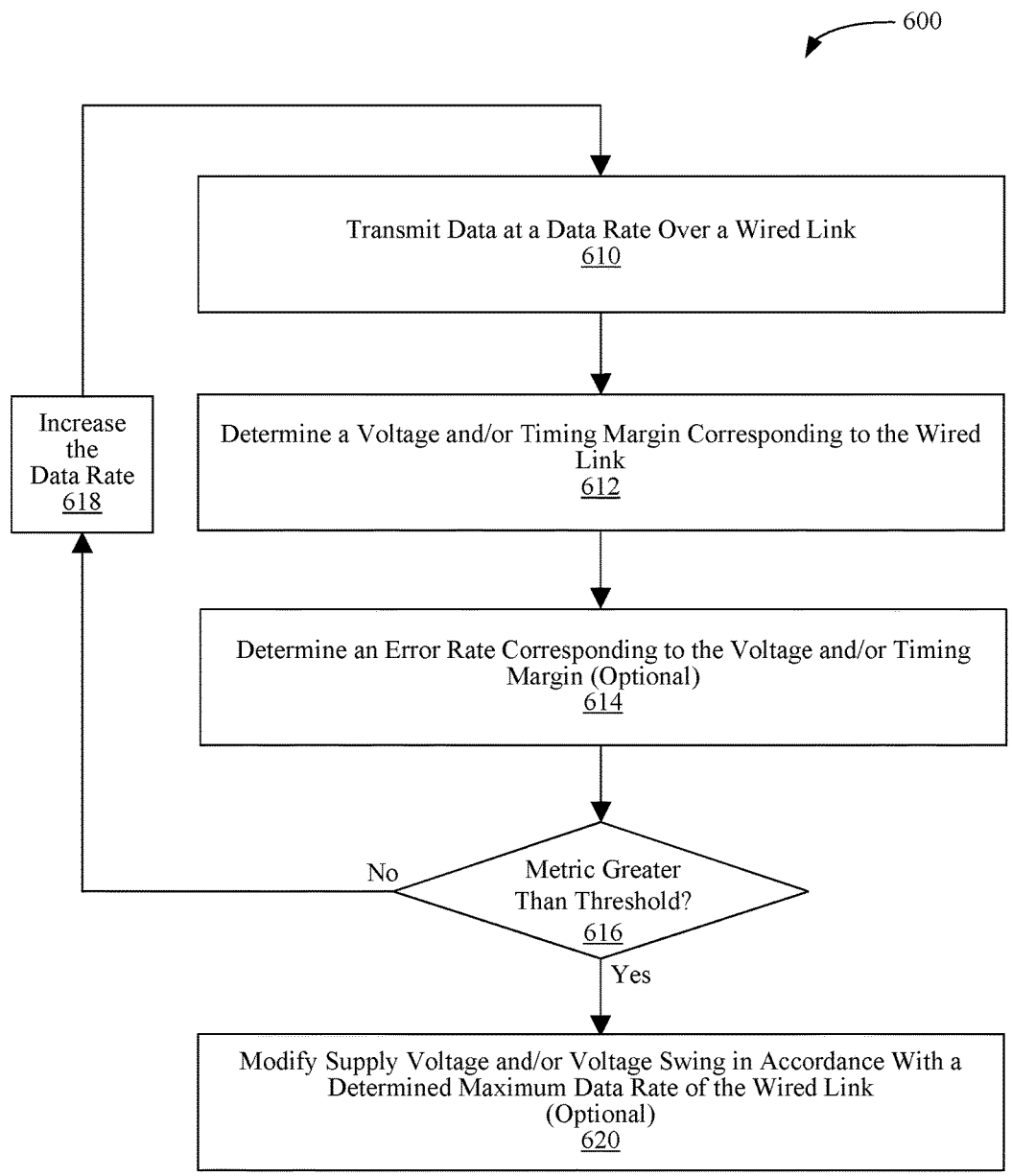
FIG. 6A is a flow diagram illustrating an embodiment of a method for determining a device's maximum data rate that is consistent with a specified data error rate.

We now discuss embodiments of processes for determining the maximum data rate and for predicting voltage margin. FIG. 6A is a flow diagram illustrating an embodiment of a method 600 for determining a data rate. The method 600 may be implemented by the control logic (212, FIG. 2A or 308, FIG. 3A) of the device in which receive circuit is located and/or the control logic of the device in which a corresponding transmit circuit is located. In some embodiments, the control logic of the device containing the receive circuit and/or the device containing the transmit circuit includes a processor that executes a set of instructions so as to implement the method 600 and/or the method 650 discussed below with reference to FIG. 6B. Alternately, the control logic may be implemented using one or more state machines to perform the method 600 and/or the method 650.

In accordance with the method, data is transmitted at a data rate over a wired link (610). A voltage and/or a timing margin corresponding to the wired link are determined (612). An error rate corresponding to the voltage and/or the timing margin are optionally determined (614). If a metric, such as an error rate that is inferred based on the voltage and/or the timing margin, is less than a threshold (616), the data rate is increased (618) and operations 610, 612 and 614 are repeated. If the metric is greater than the threshold (616), a supply voltage and/or a voltage swing are optionally modified in accordance with a determined maximum data rate of the wired link (620). For example, the supply voltage and/or voltage swing of the received data signal may be increased so as to decrease the error rate. In some embodiments, the continued operation of a transmitter is enabled even if the maximum data rate is less than a target data rate. For example, continued operation may be permitted so long as the maximum data rate is within a predefined percentage (e.g., 1%, 2% or 5%) of the target data rate. In some embodiments, there may be fewer or additional operations, an order of the operations may be rearranged and/or two or more operations may be combined.

Figure 6B:
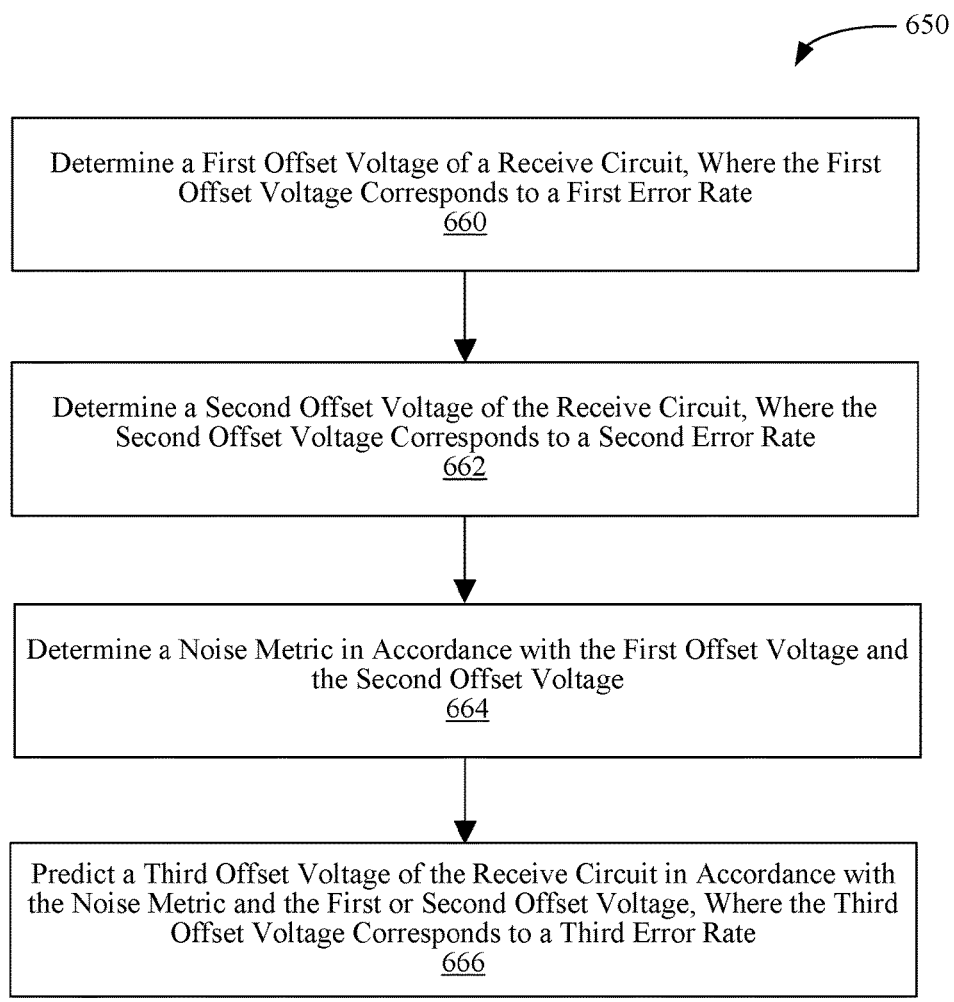
FIG. 6B is a flow diagram illustrating an embodiment of a method for determining a voltage margin that corresponds to a specified data error rate.

FIG. 6B is a flow diagram illustrating an embodiment of a method 650 for determining a voltage margin. A first offset voltage of a receive circuit is determined, where the first offset voltage corresponds to a first error rate (660). A second offset voltage of the receive circuit is determined, where the second offset voltage corresponds to a second error rate (662). A noise metric is determined in accordance with the first offset voltage and the second offset voltage (664). A third offset voltage of the receive circuit is predicted in accordance with the noise metric and the first offset voltage, where the third offset voltage corresponds to a third error rate (666). A specific example of this method was described above with reference to FIG. 4B. In some embodiments of the method, there may be fewer or additional operations, an order of the operations may be rearranged and/or two or more operations may be combined.

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

Figure 7:
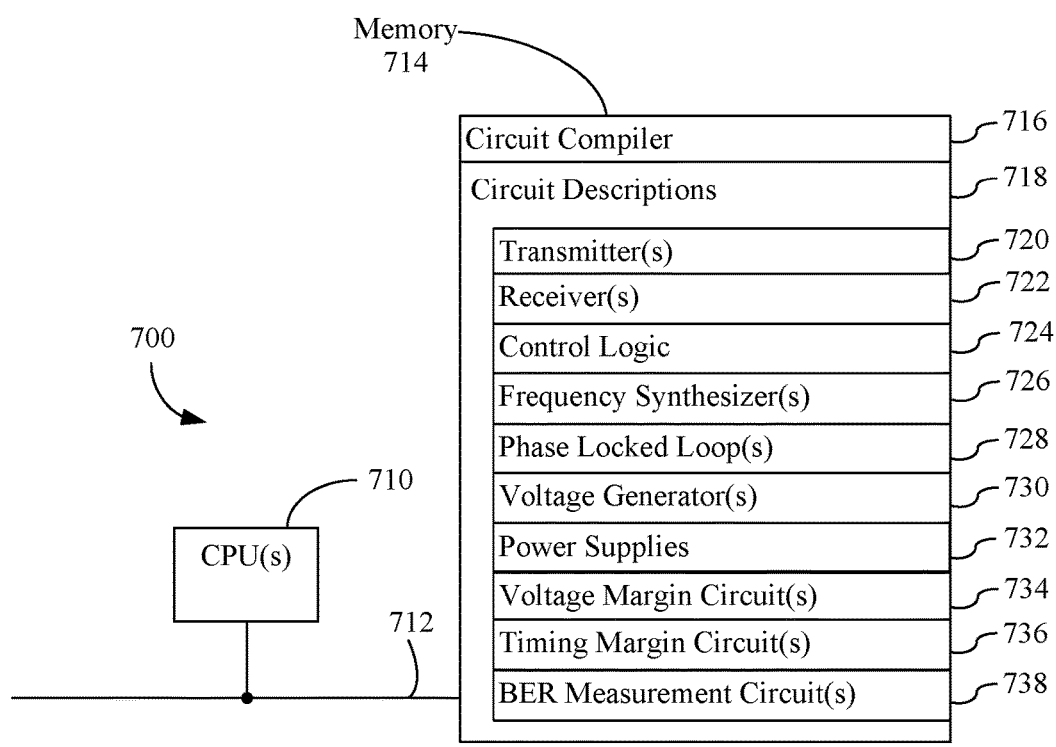
FIG. 7 is a block diagram illustrating an embodiment of a system.

FIG. 7 is a block diagram illustrating an embodiment of a system 700 for storing computer readable files containing software descriptions of the circuits. The system 700 may include at least one data processor or central processing unit (CPU) 710, memory 714 and one or more signal lines or communication busses 712 for coupling these components to one another. Memory 714 may include high-speed random access memory and/or non-volatile memory, such as one or more magnetic disk storage devices. Memory 714 may store a circuit compiler 716 and circuit descriptions 718. Circuit descriptions 718 may include circuit descriptions for the circuits, or a subset of the circuits discussed above with respect to FIGS. 1-3. In particular, circuit descriptions 718 may include circuit descriptions of one or more transmit circuits or transmitters 720, one or more receive circuits or receivers 722, one or more control logic circuits 724, one or more frequency synthesizers 726, one or more phase locked loops 728, one or more voltage generators 730, one or more power supplies 732, one or more voltage margin circuits 734, one or more timing margin circuits 736, and/or one or more bit error rate measurement circuits 738.

Figure 8:
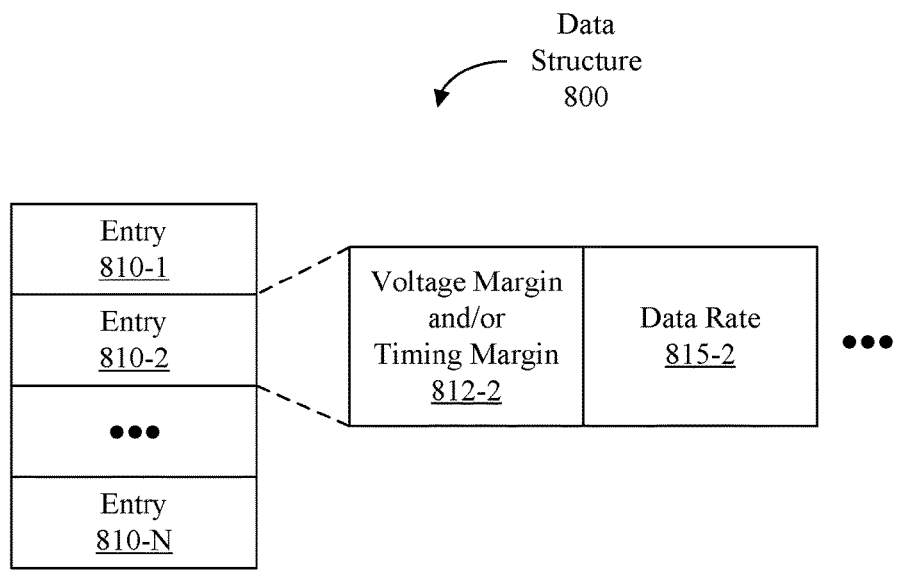
FIG. 8 is a block diagram illustrating an embodiment of a data structure.

We now discuss data structures that may used to perform the method for determining a maximum data rate. FIG. 8 is a block diagram illustrating an embodiment of a data structure 800. The data structure 800 includes multiple entries 810. A respective entry, such as entry 810-2, may include a voltage margin value and/or timing margin value 812-2 and a corresponding data rate 814-2. The entries 810 in the data structure 800 may be determined using the auto-negotiation procedure described previously.

Figure 9:
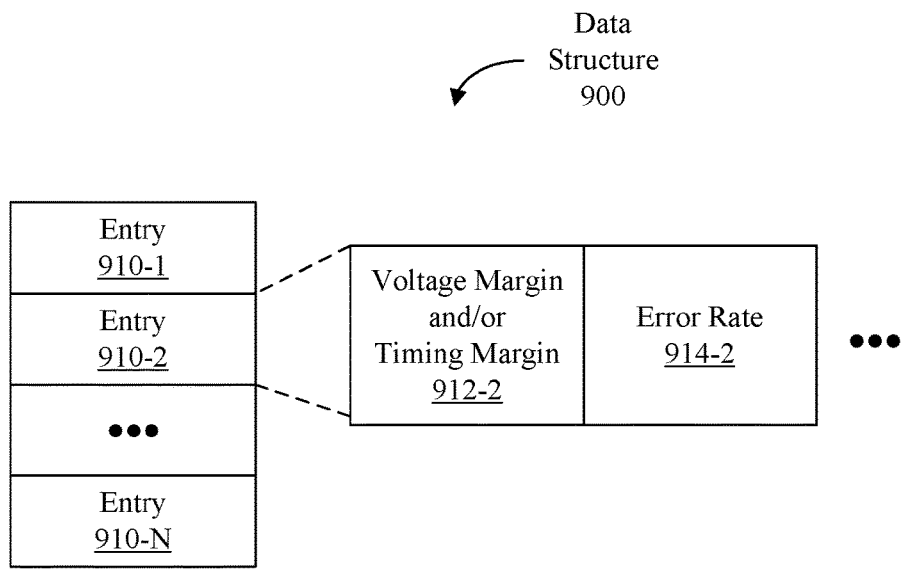
FIG. 9 is a block diagram illustrating an embodiment of a data structure.

FIG. 9 is a block diagram illustrating an embodiment of a data structure 900. The data structure 900 includes multiple entries 910. A respective entry, such as entry 910-2, may include a voltage margin value and/or timing margin value 912-2, and a corresponding error rate 914-2. The data structure may correspond to the relationship 500 (FIG. 5), which may be used to predict the voltage or timing margin at different values of the error rate. The data structures 800 and/or 900 may be reported to a host, where they may be used to determine a data rate, a supply voltage, and/or a voltage swing based on one or more system constraints, such as performance or power consumption.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A device, comprising:
a transmitter having an output configured to be coupled with a wired link; and
control logic coupled to the transmitter, wherein the control logic is configured to:
enable the transmitter to communicate information over the wired link to a second device at an initial data rate;
increase a data rate of communication of information by the transmitter over the wired link to the second device relative to the initial data rate of communication of information by the transmitter to the second device, wherein the increased data rate is a non-integer multiple of the initial data rate;
determine, for the increased data rate, a metric corresponding to communication of the information by the transmitter over the wired link to the second device; and
adjust, in response to the determination of the metric corresponding to communication of the information over the wired link, at least one of a voltage swing of the transmitter output or a supply voltage.

2. The device of claim 1, wherein the control logic is configured to use an iterative process in which the data rate of communication of information over the wired link by the transmitter to the second device is increased until a measured voltage margin corresponds to an error rate that is greater than a predetermined error rate.

3. The device of claim 2, wherein the control logic is further configured to determine a range of data rates, and wherein the range of data rates includes at least one data rate greater than the initial data rate, and corresponds to error rates that do not exceed the predetermined error rate.

4. The device of claim 2, wherein the increased data rate is less than a maximum data rate that corresponds to an error rate greater than the predetermined error rate.

5. The device of claim 1, wherein a ratio of the increased data rate and the initial data rate is greater than one and less than two.

6. The device of claim 1, wherein data included in a baseband signal transmitted by the transmitter over the wired link to the second device includes amplitude modulated data.

7. The device of claim 1, wherein the increased data rate is less than a target data rate, and the control logic is configured to increase the at least one of the voltage swing of the transmitter output or the supply voltage.

8. The device of claim 1, wherein the increased data rate is greater than a target data rate, and the control logic is configured to decrease the at least one of the voltage swing of the transmitter output or the supply voltage.

9. The device of claim 1, wherein the supply voltage is for one of a phase locked loop circuit of the device or the transmitter.

10. The device of claim 1, further including a fractional-N phase locked loop circuit to generate a clock signal provided to the transmitter.

11. A method for operating a transmitter coupled with a wired link, comprising:
at a device having the transmitter:
using the transmitter, transmitting information over the wired link to a second device at an initial data rate of communication of information;
using the transmitter, transmitting information over the wired link to the second device at an increased data rate of communication of information, wherein the increased data rate is higher than the initial data rate, wherein the increased data rate is a non-integer multiple of the initial data rate;
determining, for the increased data rate, a metric corresponding to communication of the information over the wired link to the second device; and
adjusting, in response to the determination of the metric corresponding to communication of the information over the wired link to the second device, at least one of a voltage swing of the transmitter output or a supply voltage.

12. The method of claim 11, wherein the data rate of communication of information over the wired link by the transmitter to the second device is increased iteratively until a measured voltage margin corresponds to an error rate that is greater than a predetermined error rate.

13. The method of claim 12, including determining a range of data rates, wherein the range of data rates includes at least one data rate greater than the initial data rate, and corresponds to error rates that do not exceed the predetermined error rate.

14. The method of claim 12, wherein the increased data rate is less than a maximum data rate that corresponds to an error rate greater than the predetermined error rate.

15. The method of claim 11, wherein a ratio of the increased data rate and the initial data rate is greater than one and less than two.

16. The method of claim 11, wherein data included in a baseband signal transmitted by the transmitter over the wired line to the second device includes amplitude modulated data.

17. The method of claim 11, wherein the increased data rate is less than a target data rate, and the adjusting includes increasing the at least one of the voltage swing of the transmitter output or the supply voltage.

18. The method of claim 11, wherein the increased data rate is greater than a target data rate, and the adjusting includes decreasing the at least one of the voltage swing of the transmitter output or the supply voltage.

19. The method of claim 11, wherein the supply voltage is for one of a phase locked loop circuit of the device or the transmitter.

20. A device, comprising:
transmit means for coupling an output of the device to a wired link; and
control means, coupled to the transmit means, for controlling operation of the transmit means, wherein the control means is configured to:
enable the transmit means to communicate information over the wired link to a second device at an initial data rate;
increase a data rate of communication of information by the transmit means over the wired link to the second device relative to the initial data rate of communication of information by the transmit means to the second device, wherein the increased data rate is a non-integer multiple of the initial data rate;
determine, for the increased data rate, a metric corresponding to communication of the information by the transmit means over the wired link to the second device; and
adjust, in response to the determination of the metric corresponding to communication of the information over the wired link, at least one of a voltage swing of the transmit means or a supply voltage.

* * * * *